US008701705B2

(12) United States Patent
Park

(10) Patent No.: US 8,701,705 B2
(45) Date of Patent: Apr. 22, 2014

(54) FUEL DELIVERY MODULE

(75) Inventor: Seung-Ju Park, Yongin (KR)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 723 days.

(21) Appl. No.: 12/743,766

(22) PCT Filed: Dec. 1, 2008

(86) PCT No.: PCT/EP2008/066564
§ 371 (c)(1),
(2), (4) Date: May 19, 2010

(87) PCT Pub. No.: WO2009/068694
PCT Pub. Date: Jun. 4, 2009

(65) Prior Publication Data

US 2010/0263749 A1 Oct. 21, 2010

(30) Foreign Application Priority Data

Nov. 30, 2007 (KR) ........................ 10-2007-0123241

(51) Int. Cl.
*G01F 23/30* (2006.01)
*F02M 37/10* (2006.01)

(52) U.S. Cl.
USPC ...... 137/558; 137/565.22; 137/574; 123/509; 73/318

(58) Field of Classification Search
USPC .................... 137/590, 592, 574, 558, 565.22; 123/509, 510; 73/317, 318
See application file for complete search history.

(56) References Cited

U.S. PATENT DOCUMENTS

| | | | | |
|---|---|---|---|---|
| 5,797,376 | A * | 8/1998 | Frank et al. | 123/509 |
| 6,260,542 | B1 | 7/2001 | Kochsmeier et al. | |
| 6,298,540 | B1 | 10/2001 | Benjey et al. | |
| 6,851,396 | B2 * | 2/2005 | Fromont | 123/1 A |
| 6,874,481 | B2 * | 4/2005 | Hiraiwa et al. | 123/509 |
| 7,007,675 | B2 | 3/2006 | Ida et al. | |
| 7,124,748 | B2 * | 10/2006 | Gaffield et al. | 123/509 |
| 2005/0155582 | A1 | 7/2005 | Schelhas et al. | |
| 2006/0112937 | A1 | 6/2006 | Tittmann | |

FOREIGN PATENT DOCUMENTS

| | | |
|---|---|---|
| DE | 19627578 | 1/1998 |
| DE | 102006057689 A1 | 6/2008 |
| EP | 0705971 | 4/1996 |
| GB | 2284581 | 6/1995 |
| JP | 3050795 | 5/1998 |
| JP | 2008-154251 | 7/2008 |
| KR | 10-0187931 | 1/1999 |

* cited by examiner

*Primary Examiner* — Craig Schneider
*Assistant Examiner* — Atif Chaudry
(74) *Attorney, Agent, or Firm* — Oblon, Spivak, McClelland, Maier & Neustadt, L.L.P.

(57) ABSTRACT

The present invention is directed to providing a transfer tube assembly mounted on a saddle type fuel tank. The assembly of the present invention includes: a main fuel pump allowing a fuel pump system to deliver fuel to the engine; a sender delivering residual fuel to the main fuel pump; a wire harness connecting the main module and the sender and configured to inform of a fuel amount in the sender; and a transfer tube for transferring the residual fuel in the sender to the main fuel pump. The wire harness and the transfer tube are integrally coupled and configured so that a function of the wire harness can be performed simultaneously with a function of the transfer tube.

12 Claims, 7 Drawing Sheets

FUEL DELIVERY MODULE

CROSS-REFERENCE TO RELATED APPLICATIONS

This application is a U.S. national stage application under 35 U.S.C. §371 of International Application No. PCT/EP 2008/066564 filed Dec. 1, 2008, which claims priority to Korean Patent Application No.KR 10-2007-0123241 filed Nov. 30, 2007, this application being incorporated herein by reference in its entirety for all purposes.

TECHNICAL FIELD

The present invention relates to a fuel delivery module of a vehicle, and more particularly to a fuel delivery module installed in a saddle type fuel tank.

PRIOR ART

Generally, a fuel delivery module associated with a fuel pump and a fuel level sensor is mounted in the fuel tanks of vehicles. The fuel delivery module delivers fuel to the engine of the vehicle and measures the level of fuel in the tank.

Saddle type fuel tanks are tanks which are configured to fit in the space left in an area of the vehicle where other parts are present like a motor shaft and an exhaust pipe for instance, and they are especially used in rear-wheel or four-wheel driving vehicles. Saddle tanks are typically divided into two pockets. The fuel delivery module is then generally configured to deliver fuel from and measure the fuel level in each pocket.

The saddle type fuel tank and the conventional fuel delivery module will be explained with reference to FIG. 1. The saddle type fuel tank 20 has a concave portion 22*a* at its bottom 22. The concave portion 22*a* is concaved toward an inner side of the fuel tank 20 such that the motor shaft or exhaust pipe for example, can pass there through. The fuel tank 20 is in that case divided into a main pocket 20*a* and a sub pocket 20*b* by the concave portion 22*a*. The fuel delivery module 10 includes a main module 11 disposed in the main pocket 20*a* and a sender 12 disposed in the sub pocket 20*b*.

The main module 11 contains a fuel pump and delivers fuel from the main pocket 20*a* and the sub pocket 20*b* to the engine of the vehicle. The main module 11 has a fuel level sensor 11*b* for measuring a fuel level in the main pocket 20*a* by a rotating float.

The fuel in the sub pocket 20*b* is transferred via the sender 12 to the main pocket 20*a* (particularly to the main module 11) using a transfer tube. Both ends of the transfer tube 14 are coupled to the main module 11 and the sender 12 respectively by a quick connector 14*a*.

Further, the sender 12 has a fuel level sensor 12*b* for measuring the fuel level in the sub pocket 20*b* by a rotating float. A resistance value of the fuel level by the sensor 12*b* of the sender 12 is transferred via a wire harness 13 to the main module 11. The fuel delivery module 10 generally transfers the fuel level measured at the main module 11 and the sender 12 (resistance value outputted by the fuel level sensors) to an instrument cluster of the vehicle. The driver can hence be informed of the total residual amount of fuel in the tank by said instrument cluster.

In the fuel delivery module 10, the main module 11 and the sender 12 are interconnected with the wire harness 13 and the transfer tube 14. Generally, the main module 11 and the sender 12 are assembled in the fuel tank 20 using mounting flanges 11*a* and 12*a* which are mounted at an upper side 21 of the fuel tank 20 and lower portions of the main module 11 and the sender 12 contact the bottom 22 of the fuel tank 20. As to the wire harness 13 and the transfer tube 14, they may each be assembled on the main module 11 and the sender 12 outside of the fuel tank 20 or inside of the fuel tank 20. For instance, as shown in FIG. 1, the fuel delivery module 10 may be configured such that the wire harness 13 is positioned at the outside of the fuel tank 20 and the transfer tube 14 is positioned at the inside of the fuel tank 20. Anyway, the wire harness 13 and the transfer tube 14 require a separate assembling process.

When the wire harness 13 and the transfer tube 14 are outside of the fuel tank 20, it is easy to check visually whether or not they are correctly assembled. However, such an assembly is disadvantageous in view of the emission of the fuel tank 20. On the contrary, an assembly inside of the fuel tank 20 is advantageous in view of the emission of the fuel tank 20. Thus, such an assembly is generally preferred although more difficult to realize in practice. Further, such a connecting process involves a significant amount of time and money.

Besides, when the wire harness 13 and the transfer tube 14 are positioned at the inside of the fuel tank 20, the correct assembling of the wire harness 13 can easily be confirmed by checking the resistance value outputted from the fuel level sensors 11*b* and 12*b*. However, the correct assembling of the transfer tube 14 cannot easily be checked at the outside of the fuel tank 20.

TECHNICAL PROBLEM

The present invention aims at solving such problems. An object of the present invention is to provide a fuel delivery module configured such that a wire harness and a transfer tube are simultaneously connected to a sender. Hence, the time for assembly is reduced and it becomes easy to check the completion of the assembly.

TECHNICAL SOLUTION

In order to achieve such an object and other objects, the invention relates to a transfer tube assembly of a fuel pump module of a vehicle, comprising:

- a main fuel pump for allowing a fuel pump system to deliver a fuel;
- a sender for delivering a residual fuel to the main fuel pump;
- a wire harness for connecting the main fuel pump and the sender and being configured to inform of a fuel amount in the sender; and
- a transfer tube for transferring the residual fuel in the sender to the main fuel pump, wherein the wire harness and the transfer tube are integrally coupled and configured so that a function of the wire harness can be performed simultaneously with a function of the transfer tube.

Preferably the transfer tube assembly, also called fuel delivery module, comprises a main module, said module having a fuel pump and a first fuel level sensor; a sender having a second fuel level sensor and a first contact terminal electrically connected to the second fuel level sensor; a wire harness electrically connecting the main module and the second fuel level sensor; a transfer tube fluid-connecting the main module and the sender; and a connection unit having a fluid passage connected with the transfer tube and a second contact terminal connected with the wire harness wherein the connection unit is removably coupled to the sender such that the second contact terminal contacts the first contact terminal.

Generally, the main module comprises a reservoir on which the first level sensor is fixed and in which the pump is located. As to the sender, it generally acts as a support for the second fuel level sensor and for the transfer tube through which fuel is sucked by the pump into the part of the tank where said sender is located. In a saddle tank, main module and sender are generally located in different pockets.

According to the invention, a single connection unit allows the fixation of the transfer tube and of the wire harness to the sender. In a preferred embodiment, both connections are made at different locations (by different parts) of the connecting unit. Such a solution is more robust and cheaper than a solution where both connections (electrical and fluid) are made at a single location of the connecting unit, and it only requires one additional connecting step. In that embodiment, the connecting unit is preferably first assembled with the transfer tube and the wire harness and then, the hole is connected to the sender through said connecting unit. Preferably as well, the tube and the harness are integrated to each other (for instance: the latter may be wound around the former) but both have a free length at their end so that said free ends can effectively be connected to different parts (at different locations) of the connecting unit.

In a preferred embodiment of the invention, the connecting unit integrates a filter which is in fluid contact with the fluid passage in a way such that the pump is able to suck fuel through said filter inside the fluid passage and then, through the transfer line.

In another preferred embodiment of the invention, the fuel delivery module further includes a female coupling element, which is disposed at one of the connection unit and the sender. The fuel delivery module of that embodiment also includes a male coupling element, which is disposed at the other of the connection unit and the sender and fitted into the female coupling element by rotation in a way such that the first contact terminal is positioned to contact the second contact terminal when said rotation is finished. The female coupling element may include a groove or slot. Moreover, the male coupling element may include a projection fitted into the groove or slot.

In a more preferred embodiment, the sender further includes a mounting flange for being mounted on the fuel tank and a support retained (preferably resiliently) in/on the mounting flange. The first contact terminal is then preferably disposed in/on the support and the connection unit is then preferably removably coupled to the support.

In such a case, the female coupling element may include a pair of grooves. The grooves are formed in the support symmetrical to each other and have an open end and a close end. The male coupling element may include a pair of projections. The projections are formed in the connection unit and fitted into the grooves via the open end. The first contact terminal is positioned between the grooves in order to contact the second contact terminal when the projection contacts the close end of the groove.

The invention also relates to a transfer tube assembly of a fuel pump module for an internal combustion engine, comprising

- an integral connector integrally formed and being connected to each of a transfer tube and a wire harness in the fuel pump module; and
- a resistance value measuring contact portion provided in the integral connector and being configured to simultaneously confirm a resistance value of a distal end of a passage of the transfer tube.

The main module of the fuel delivery module may be mounted in any one of the pockets of a fuel tank having two or more pockets (saddle tank) and the sender may be mounted in another pocket. Hence, the present invention also concerns such a saddle tank.

The present invention also relates to a single piece connector acting as the connection unit described above and hence, having a fluid connecting part and an electrical connecting part (contact terminal), said parts being at different locations of the connector. By single piece is meant that the connector is a single object. Preferably, the fluid connecting part is molded in one piece with said connector while the contact terminal is fixed on the connector on such a location that the fluid connecting part and the electrical connecting part are not located co-axially, or in other words, the electrical connecting part is not located around the fluid connecting part but is fixed on a part of the connector which is different from the fluid connecting part.

Such a connector is preferably used in a saddle tank to allow fluid and electrical connection between a main module located in one pocket and a sender located in the other pocket (main module and sender being as defined above).

Finally, the present invention also relates a method for mounting a fuel delivery module as described above into a saddle tank comprising a main pocket and a sub pocket, said method comprising the steps of:

1. mounting the main module into the main pocket;
2. connecting the transfer tube and the wire harness to the main module at one end;
3. connecting the other end of the transfer tube and the wire harness to the connection unit;
4. connecting the connection unit to the sender; and
5. mounting the sender into the sub pocket, wherein steps 1 to 3 can be performed in any order.

ADVANTAGEOUS EFFECTS

According to the present invention, since the wire harness and the transfer tube can be simultaneously assembled on the sender by using the connection unit, a rapid and easy assembling is possible.

Further, since the transfer tube and the wire harness are connected to the connection unit, a sender with a constitution simpler than the prior art can be provided.

Finally, the effective assembly of the wire harness and the transfer tube can be checked easily by measuring a resistance value of the fuel level sensors after the assembly is completed.

MODE FOR INVENTION

Referring to FIGS. 2 to 7, an embodiment of the present invention will be explained.

Figure 1:
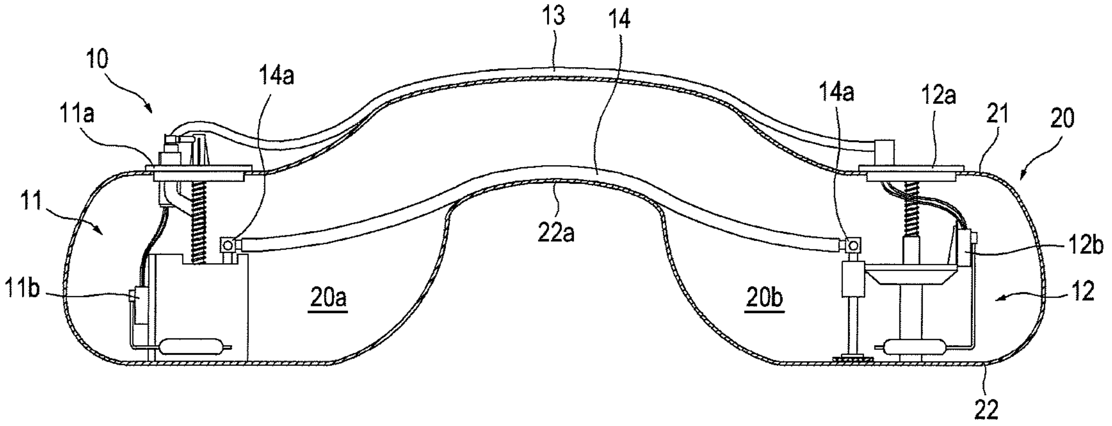
FIG. 1 is a schematic cross-sectional view of a fuel delivery module of the prior art.

The fuel delivery module of this embodiment is intended to deliver fuel to an engine of a vehicle, to recover unused fuel and to detect the fuel level in the fuel tank as a resistance value. It may be used for the saddle tank shown in FIG. 1.

Figure 2:
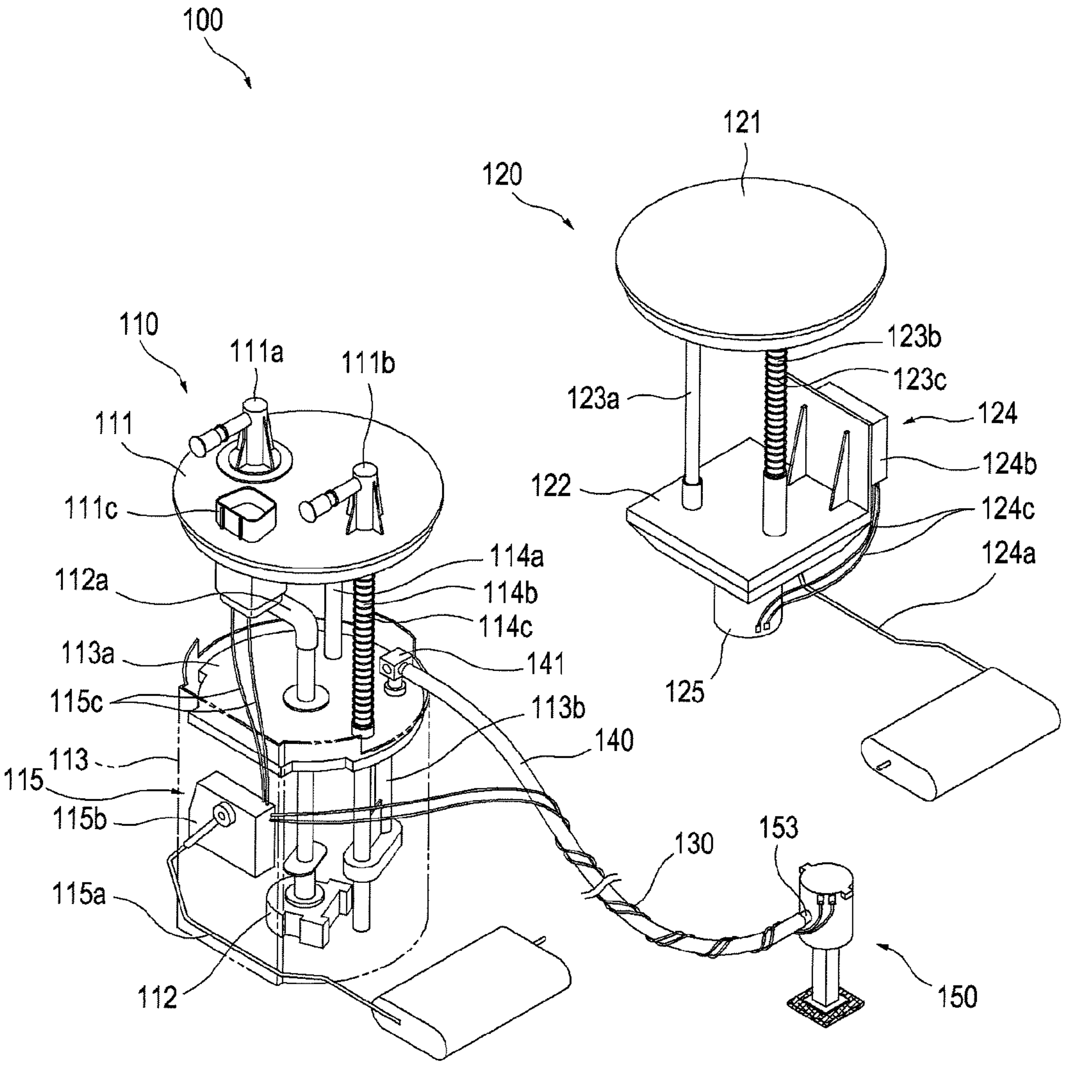
FIG. 2 is a perspective view of a fuel delivery module in accordance with an embodiment of the present invention.
Figure 3:
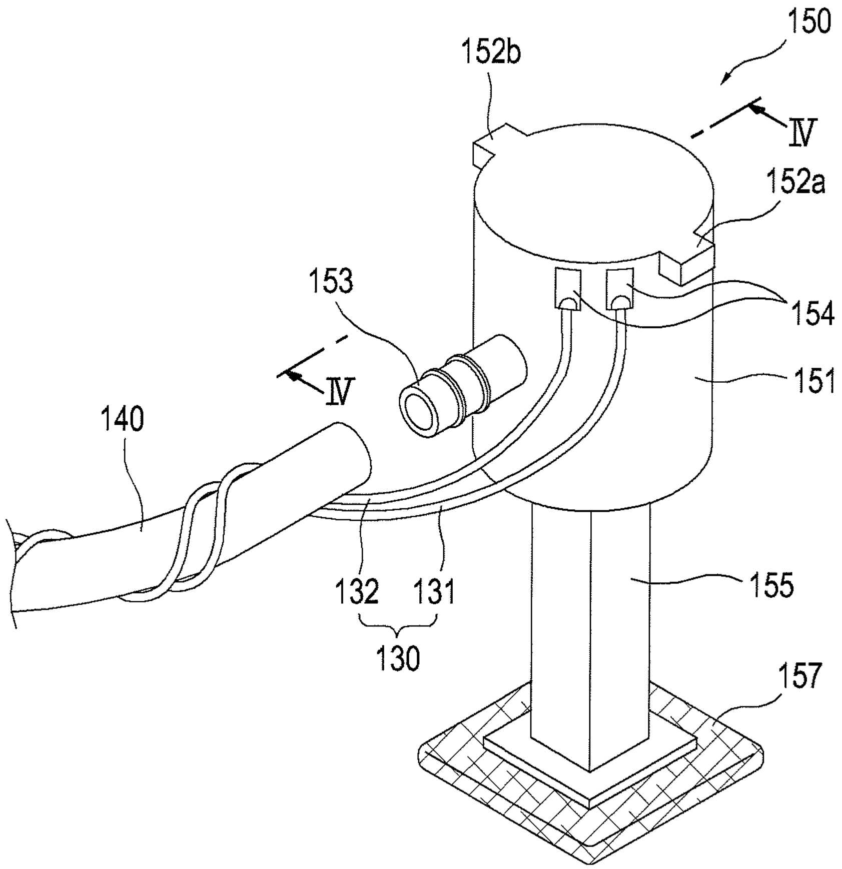
FIG. 3 is a perspective view of a connection unit shown in FIG. 2.

FIG. 2 shows a fuel delivery module 100 including a main module 110, a sender 120, a wire harness 130, a transfer tube 140 and a connection unit 150. The wire harness 130 and the transfer tube 140 are attached to the connection unit 150 at one end, and to the main module 110 on the other end. The connection unit 150 can be removably coupled to the sender 120. The main module 110 can be mounted in the main pocket 20*a* of the saddle tank 20. The sender 120 can be disposed in the sub pocket 20*b* of the saddle tank 20. The wire harness 130 is intended to perform an electrical connection between the main module 110 and the sender 120 and is configured to inform of the fuel amount in the sender 120. The transfer tube 140 is intended to perform a fluid connection between the main module 110 and the sender 120. That is, the fuel in the sub pocket 20*b* can be transferred via the transfer tube 140 to the main module 110. The connection unit 150 is intended to be coupled to the sender 120 and to be disposed in the sub pocket 20*b*. The connection unit 150 is intended to simultaneously perform the electrical connection and fluid connection of the main module 110 and the sender 120.

The main module 110 has a mounting flange 111 intended to be coupled to the upper side 21 of the fuel tank 20. A fuel outlet fitting 111*a*, a fuel inlet fitting 111*b* and a connector 111*c* are attached to an upper surface of the mounting flange 121. The fuel outlet fitting 111*a* enables communication with the engine of the vehicle via a fuel feed line. The fuel inlet fitting 111*b* enables communication with the engine of the vehicle via a fuel return line. Another wire harness 115C is provided to send the information on the global fuel level in the tank to an instrument cluster of the vehicle through the connector 111*c*.

The main module 110 has a reservoir 113 for storing the fuel and accommodating a fuel pump 112. The fuel pump 112 is disposed within the reservoir 113 and communicated with the fuel outlet fitting 110*a* via a conduit 112*a*. A cover 113*a* is mounted on an open end of the reservoir 113.

The main module 110 has a guide rod 114*a* for connecting the mounting flange 111 and the reservoir 113, a guide pipe 114*b* extended from the fuel inlet fitting 110*b* into the reservoir 113, and a compression coil spring 114*c* disposed around the guide pipe 114*b* between a lower surface of the mounting flange 111 and the cover 113*a*. When the main module 110 is mounted on the fuel tank 20, the reservoir 113 contacts the bottom 22 of the fuel tank 20 by an operation of the compression coil spring 114*c*.

The cover 113*a* is provided with a conduit 113*b*. One end of the conduit 113*b* is extended to the outside of the cover 113*a* while the other end is extended into the reservoir 113. The transfer tube 140 is coupled to one end of the conduit 113*b* via the connector 141. Thus, the fuel in the sub pocket 20*b* can be introduced via the transfer tube 140 into the reservoir 113 of the main module 110.

The main module 110 has a first fuel level sensor 115 for measuring a level of the fuel in the main pocket 20*a*. The first fuel level sensor 115 is attached to a side surface of the reservoir 113. The first fuel level sensor 115 has a rotatable float 115*a* and a detecting portion 115*b* for measuring the fuel level by a resistance value varying depending on a rotation of the float 115*a*. A proximal end of the float 115*a* is rotatably coupled to the detecting portion 115*b*.

One end of the wire harness 130 is connected to the detecting portion 115*b* of the first fuel level sensor 115 while the other end is connected to the connection unit 150. One end of the transfer tube 140 is connected with the conduit 113*b* by the connector 141 while the other end is fitted on a fluid outlet 153 of the connection unit 150.

The sender 120 has a mounting flange 121 intended to be coupled to the upper side 21 of the fuel tank 20. Further, the sender 120 has a support 122 for resiliently supporting the connection unit 150. The support 122 is retained against the mounting flange 121 by guide rods 123*a* and 123*b*, which are extended from the mounting flange 121 through the support 122, and a compression coil spring 123*c* disposed around the guide rod 123*b* between a lower surface of the mounting flange 121 and the support 122. The sender 120 has a mounting shaft 125 for mounting the connection unit 150. The mounting shaft 125 is integrally formed at a lower surface of the support 122.

The sender 120 has a second fuel level sensor 124 for measuring the fuel level in the sub pocket 20*b*. The second fuel level sensor 124, which is similar to the first fuel level sensor 115, has a rotatable float 124*a* and a detecting portion 124*b*. The detecting portion 124*b* is attached to the support 122. Two wires 124*c* extending from the detecting portion 124*b* are connected to a first contact terminal 125*c* in the mounting shaft 125.

In order to couple the connection unit 150 and the sender 120, the fuel delivery module 100 has a male coupling element and a female coupling element, which are connectable through fitting by rotation. The male coupling element and the female coupling element are disposed on the connection unit 150 and the sender 120, respectively. In this embodiment, the male coupling element is disposed on the connection unit 150 and the female coupling element is disposed on the sender 120. The connection unit 150 is fixed in the mounting shaft 125 of the sender 120 by such male and female coupling elements through fitting by rotation.

Further, the fuel delivery module 100 includes a second contact terminal and a first contact terminal, which are intercontactable with each other at the time of coupling the connection unit 150 and the sender 120.

The second contact terminal 154 is disposed in the connection unit 150 and connected to the wire harness 130. The first contact terminal 125*c* is disposed in or around an element where the sender 120 and the connection unit 150 are coupled. It is also connected with the wires 124*c* extended from the detecting portion 124*b* of the second fuel level sensor 124. Thus, the electric connection is accomplished at the same time of coupling the connection unit 150 with the sender 120.

Referring to FIGS. 3 to 6, the connection unit 150 and the mounting shaft 125 of the sender 120 will now be explained.

Figure 4:
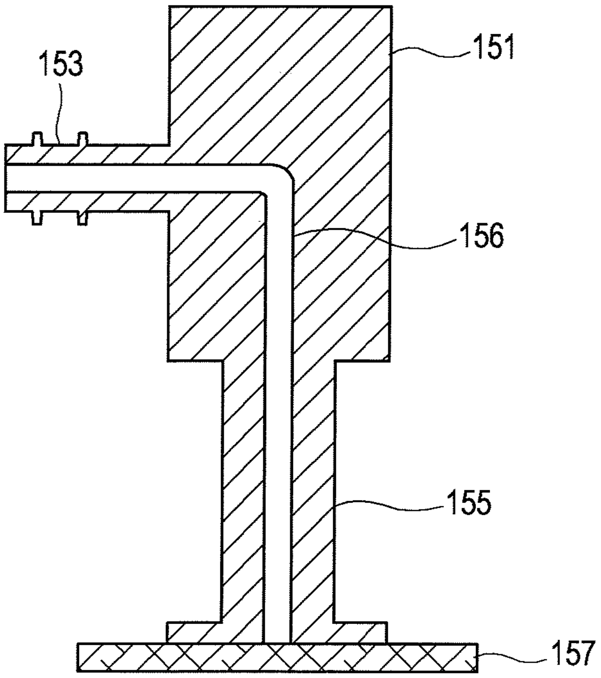
FIG. 4 is a cross-sectional view taken along a line IV-IV of FIG. 3.

The connection unit 150 has a cylindrical body 151, a suction pipe 155 coaxially extended from the cylindrical body 151 and the fluid outlet 153 projected on a peripheral surface of the cylindrical body 151. Further, as shown in FIG. 4, a fluid passage 156 penetrating from an end of the suction pipe 155 to an end of the fluid outlet 153 is formed in the connection unit 150. A mesh filter 157 is attached to an end of the suction pipe 155. One end of the transfer tube 140 is intended to be fitted on the fluid outlet 153. Thus, the fuel in the sub pocket 20*b* can be transferred via the fluid passage 156 into the reservoir 113 of the main module 110 via the transfer tube 140.

Figure 5:
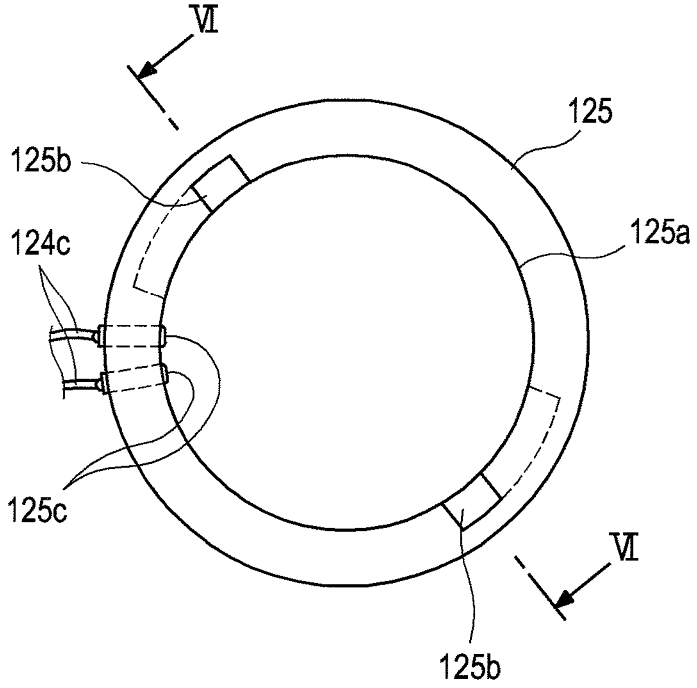
FIG. 5 is a bottom view of a mounting shaft shown in FIG. 2.
Figure 6:
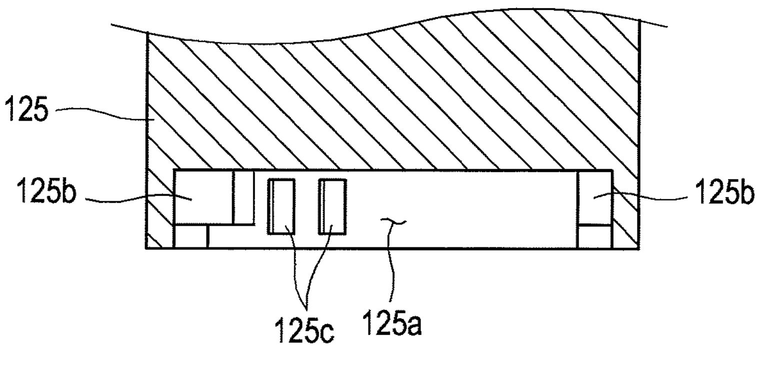
FIG. 6 is a cross-sectional view taken along a line VI-VI of FIG. 5.

The connection unit 150 has fitting projections 152*a* and 152*b* as the male coupling element, which are diametrically opposite to an upper end edge of the cylindrical body 151. The fitting projections 152*a* and 152*b* can be inserted and fitted into a fitting groove 125*b* of the mounting shaft 125, as shown in FIG. 5.

The second contact terminal 154 is made up of a pair of conductors which are positioned around an upper end edge of the cylindrical body 151. Each wire 131 and 132 of the wire harness 130 is bonded to each conductor of the second contact terminal 154.

A cylindrical mounting socket 125*a* is formed at a lower end of the mounting shaft 125. The mounting socket 125*a* is opened downwardly. The mounting socket 125*a* has an inner diameter sized to be capable of accommodating an upper portion of the cylindrical body 151. A pair of fitting grooves 125*b* is formed as the female coupling element at a peripheral surface of the mounting socket 125*a*. The fitting grooves 125*b* are diametrically opposite and symmetrical to each other. The fitting grooves 125*b* are sized so as to be capable of receiving and fitting the fitting projections 152*a* and 152*b* of the connection unit 150 therein. An open end of the fitting groove 125*b* is positioned at a lower surface of the mounting shaft 125 such that the open end of the fitting groove 125*b* contacts a lower side edge of the mounting socket 125*a*. The fitting groove 125*b* is extended from the peripheral surface of the mounting socket 125*a* along a circumferential direction while being spaced apart in a predetermined distance from the open end. The pair of the first contact terminals 125*c* is projected on the internal peripheral surface of the mounting socket 125*a* between the fitting grooves 125*b* at a height approximately the same as that of the fitting groove 125*b*. When the cylindrical body 151 is inserted into the mounting socket 125 and then rotated, the first contact terminal 125*c* and the second contact terminal 154 contact each other to thereby form the electrical connection between the second fuel level sensor 124 and the first fuel level sensor 115.

Referring to FIGS. 3 to 7, an installation of the fuel delivery module 100 and an assembly of the connection unit 150 will now be explained.

Figure 7:
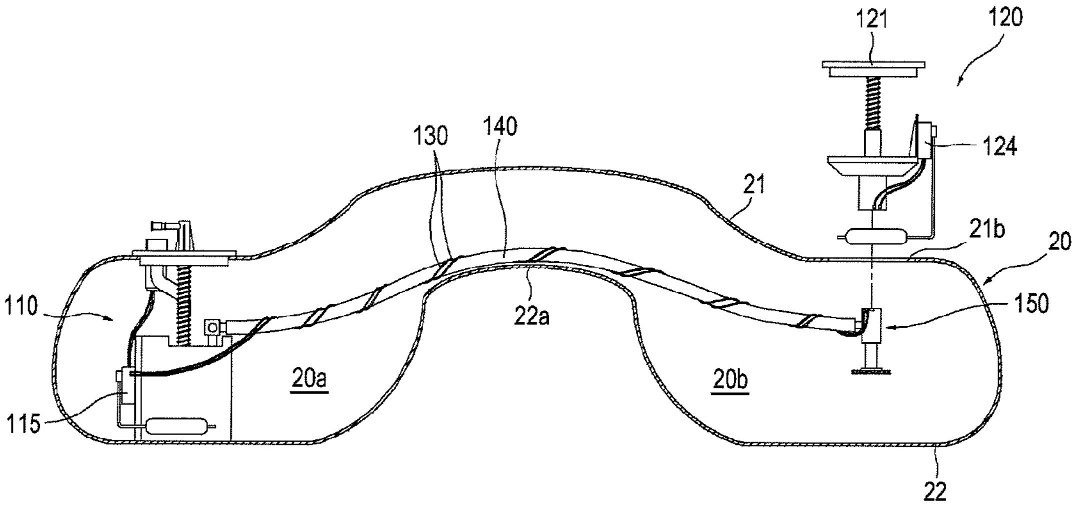
FIG. 7 is a cross-sectional view showing an example of installing the fuel delivery module in accordance with the same embodiment of the invention.

As shown in FIG. 7, while the main module 110 is installed in the main pocket 20*a* side of the fuel tank 20, the connection unit 150 is ready to be coupled to the mounting shaft 125 of the sender 120. Since one end of the wire harness 130 is bonded to the connection unit 150 and one end of the transfer tube 140 is fitted to the connection unit 150, the electrical connection and fluid connection of the main module 110 and the sender 120 can be accomplished at once by coupling the connection unit 150 to the mounting shaft 125 of the sender 120.

More specifically, the fitting projections 152*a* and 152*b* are aligned with the open end of the fitting grooves 125*b* and the upper portion of the cylindrical body 151 is inserted into the mounting socket 125*a*. When an upper surface of the cylindrical body 151 contacts an upper surface of the mounting socket 125*a*, the cylindrical body 151 is rotated against the mounting shaft 125. By doing so, the fitting projections 152*a* and 152*b* are inserted into the fitting grooves 125*b* while sliding within the fitting grooves 125*b*. When the fitting projections 152*a* and 152*b* contact the close end of the fitting groove 125*b*, the rotation is stopped. At this time, the second contact terminal 154 of the connection unit 150 contacts the first contact terminal 125*c* of the mounting shaft 125. To this end, the first contact terminal 125*c* of the mounting shaft 125 is positioned to contact the second contact terminal 154 of the connection unit 150 when the rotation on the peripheral surface of the mounting socket 125*a* against the mounting socket 125*a* of the cylindrical body 151 is stopped.

After the connection unit 150 is assembled with the sender 120, the sender 120 is mounted in the sub pocket 20*b* via the opening 21*b*. When the mounting is completed, the mesh filter 157 contacts the bottom 22 of the fuel tank 20.

After the assembling of the fuel delivery module 100 is completed, if the fuel tank 20 is inverted (turned upside down), the floats 115*a* and 124*a* of the first and second fuel level sensors 115 and 124 will be turned toward an upper portion of the fuel tank 20, so that the first and second fuel level sensors 115 and 124 should output the resistance value corresponding to the full level of the tank. Hence, the effective assembly of the wire harness 130 and of the transfer tube 140 can be easily checked only by measuring such a resistance value.

To ensure the coupling between the female coupling element and the male coupling element and the contact between the second contact terminal and the first contact terminal, an element for snap-engaging the female coupling element and the male coupling element to each other may be provided. For example, the fitting grooves 125*b* may be provided with an elastically flexible member of a hook-like or pawl-like shape, while the fitting projection 125*a* may be provided with a groove or a recess adapted to complementarily contact or engage said elastically flexible member.

Further, in order to facilitate the coupling of the connection unit 150 and the mounting shaft 125, a cylindrical pin downwardly projected from the mounting socket 125*a* may be formed and the cylindrical body 151 may be provided with a bore sized to be capable of inserting the pin therein. In such a case, while the pin is inserted into the bore, the cylindrical body 151 can be fitted into the mounting socket 125*a*.

Further, although the connection unit 150 is coupled to the mounting shaft 125 formed in the support 122, the connection unit 150 may be directly formed at a lower surface of the support 122 without the mounting shaft 125. That is, a pair of fin members may be formed at the lower surface of the support 122 and a slot similar to the shape of the fitting groove 125*b* may be formed in the fin members. The fin members are downwardly projected and symmetrical each other. In such a case, the first contact terminal 125*c* may be disposed to contact the second contact terminal 154 when the coupling of the connection unit 150 on another support member is completed.

In another embodiment, the connection unit 150 may be integrated to the transfer tube 140.

Figure 8:
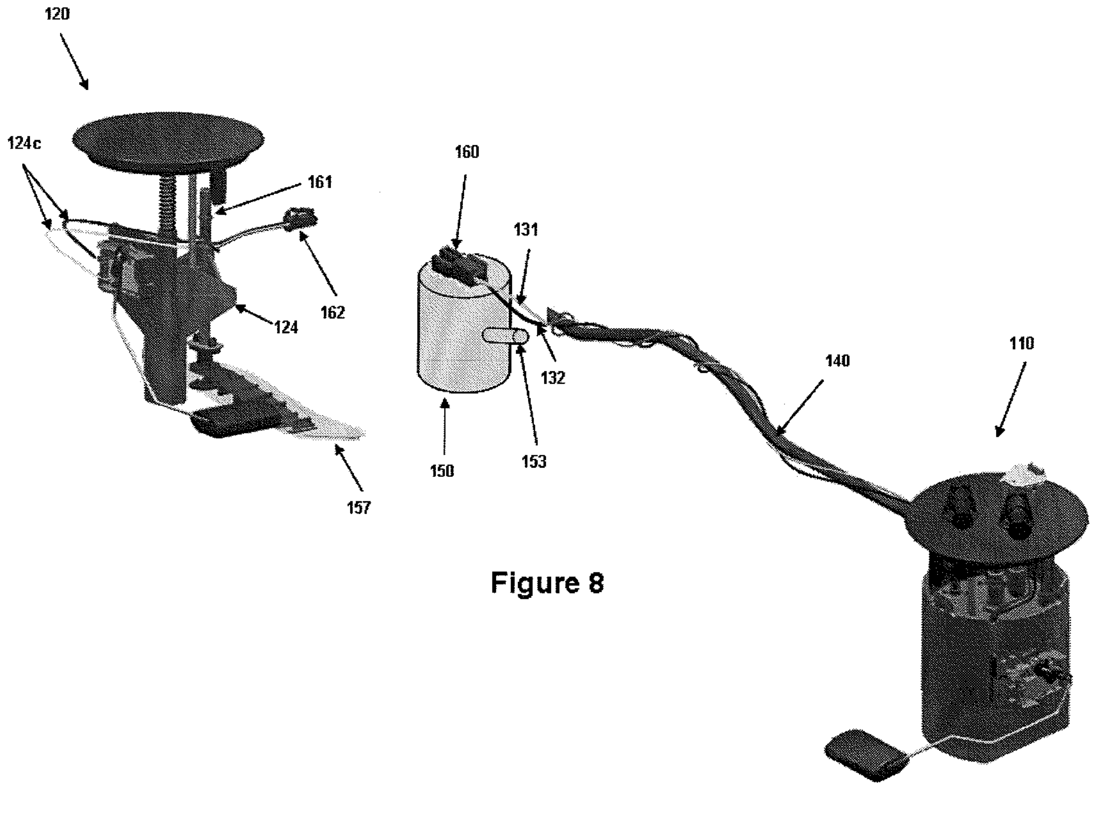
FIG. 8 shows a perspective view of another embodiment of the invention.

Referring now to FIG. 8, a fuel delivery module with another type of connection unit 150 will be described. In this embodiment, the connection unit 150 comprises a fluid outlet 153 to which the transfer tube 140 can be fitted, but the electrical connection is different. Here, the free end of wires 131, 132 are connected to a first connecting plug 160 by means of a second contact terminal 154 (not illustrated) while the free end of wires 124*c* are connected to a second connecting plug 162 by means of a first contact terminal 125*c* (not illustrated). Both connecting plugs 160 and 162 are plugged together on top of and externally to the connection unit 150 so as to bring said contact terminals 125*c*, 154 into electrical contact and to fix the wires on top of the connection unit 150. The support 124 consists of an injected plastic part that integrates a nipple 161 on which the connection unit 150 can be mounted.

So as to prevent problems of corrosion of terminals 125*c* and 154, both connecting plugs 160, 162 are isolated from the fuel present in the tank.

In this embodiment, the filter (or strainer) 157 is fixed to the support 124 in such a manner that fluid can be sucked through the filter, onto the nipple 161 and directly into the transfer tube 140 via the connecting unit 150.

While the preferred embodiments of the present invention are described above, the present invention may include other embodiments and modifications without deviating from the subject matter or scope of the present invention.

The invention claimed is:

1. A transfer tube assembly of a fuel pump module of a vehicle, comprising:

a main fuel pump for allowing a fuel pump system to deliver a fuel;

a sender for delivering a residual fuel to the main fuel pump;

a wire harness for connecting the main fuel pump and the sender and being configured to inform of a fuel amount in the sender; and a transfer tube for transferring the residual fuel in the sender to the main fuel pump, wherein the wire harness and the transfer tube are integrally coupled and configured so that a function of the wire harness can be performed simultaneously with a function of the transfer tube.

wherein the integral coupling of the wire harness and the transfer tube is accomplished via a single connection unit which allows the fixation of the transfer tube and of the wire harness to the sender.

2. The transfer tube assembly according to claim 1, further comprising a main module, wherein the main fuel pump has a first fuel level sensor and is located in the main module, wherein the sender has a second fuel level sensor and a first contact terminal electrically connected to the second fuel level sensor, wherein the wire harness electrically connects the main module and the second fuel level sensor, wherein the transfer tube fluid-connects the main module and the sender, and wherein the connection unit has a fluid passage connected with the transfer tube and a second contact terminal connected with the wire harness, the connection unit being removably coupled to the sender such that the second contact terminal contacts the first contact terminal.

3. The transfer tube assembly of claim 2, further comprising:

a female coupling element disposed at one of the connection unit and the sender; and a male coupling element disposed at the other of the connection unit and the sender, the male coupling element being fitted into the female coupling element by rotation, wherein the first contact terminal is positioned to contact the second contact terminal when a rotation of the male coupling element against the female coupling element is finished.

4. The transfer tube assembly of claim 3, wherein the female coupling element includes a groove or a slot and the male coupling element includes a projection fitted into the groove or slot.

5. The transfer tube assembly of claim 4, wherein the female coupling element is symmetrically formed in a support and includes a pair of grooves having an open end and close end;

wherein the male coupling element is formed in the connection unit and includes a pair of projections fitted into the grooves via the open end; and wherein the first contact terminal is positioned between the grooves to contact the second contact terminal when the projection contacts the close end of the groove.

6. A fuel tank comprising:

at least two pockets; and a transfer tube assembly according to claim 2, wherein the main module is mounted on any one of the at least two pockets of the tank, and wherein the sender is mounted on any other of the at least two pockets of the tank.

7. A method for mounting a transfer tube assembly into the tank according to claim 6 and including a main pocket and a sub pocket, said method comprising the steps consisting of:

a) mounting the main module into the main pocket of the tank;

b) connecting the transfer tube and the wire harness to the main module at one end of the transfer tube;

c) connecting the other end of the transfer tube and the wire harness to the connection unit;

d) connecting the connection unit to the sender; and e) mounting the sender into the sub pocket of the tank.

8. The transfer tube assembly of claim 1, wherein said transfer tube and said wire harness are wound around each other.

9. A single piece connection unit to connect to a sender of a fuel pump module of a vehicle, the connection unit comprising:

a fluid connecting part;

an electrical connecting part; and a male or female coupling element which couples by rotation to a corresponding female or male coupling element disposed on said sender, wherein said fluid connecting part and said electrical connecting part are located at different locations of and externally to the connection unit.

10. The connection unit according to claim 9, wherein the fluid connecting part is molded in one piece with said connecting unit while the electrical connecting part is fixed on the connecting unit.

11. The connection unit according to claim 9, wherein said connection unit has a cylindrical body and further comprises a suction pipe coaxially extending from the cylindrical body, and wherein the fluid connecting part projects on a peripheral surface of the cylindrical body.

12. The connection unit according to claim 9, wherein said connection unit has a cylindrical body, and wherein said electrical connecting part includes a pair of conductors which are positioned around an upper end edge of the cylindrical body.

* * * * *